United States Patent
Chincholikar et al.

(10) Patent No.: US 12,120,141 B2
(45) Date of Patent: Oct. 15, 2024

(54) SECURITY SCORES

(71) Applicant: Hewlett-Packard Development Company, L.P., Spring, TX (US)

(72) Inventors: Narendra Kumar Chincholikar, Pune (IN); Sanket Anavkar, Fort Collins, CO (US); Vaibhav Tarange, Pune (IN); Manohar Lal Kalwani, Pune (IN)

(73) Assignee: Hewlett-Packard Development Company, L.P., Spring, TX (US)

(*) Notice: Subject to any disclaimer, the term of this patent is extended or adjusted under 35 U.S.C. 154(b) by 390 days.

(21) Appl. No.: 17/387,741

(22) Filed: Jul. 28, 2021

(65) Prior Publication Data
US 2022/0038488 A1 Feb. 3, 2022

(30) Foreign Application Priority Data
Jul. 28, 2020 (IN) .............................. 202041032367

(51) Int. Cl.
| H04L 29/06 | (2006.01) |
| G06N 5/04 | (2023.01) |
| G06N 7/00 | (2023.01) |
| G06N 7/01 | (2023.01) |
| H04L 9/40 | (2022.01) |

(52) U.S. Cl.
CPC .......... H04L 63/1433 (2013.01); G06N 5/04 (2013.01); G06N 7/01 (2023.01)

(58) Field of Classification Search
CPC ......... H04L 63/1433; G06N 7/01; G06N 5/04
USPC ........................................................ 726/25
See application file for complete search history.

(56) References Cited

U.S. PATENT DOCUMENTS

| 9,323,935 | B2 | 4/2016 | Condry et al. |
| 10,586,280 | B2 | 3/2020 | McKenna et al. |
| 2009/0024663 | A1 | 1/2009 | McGovern |
| 2017/0214701 | A1* | 7/2017 | Hasan ................. H04L 63/1491 |
| 2019/0098023 | A1* | 3/2019 | Dinerstein ............ G06F 21/554 |
| 2020/0021607 | A1* | 1/2020 | Muddu ................. G06F 16/254 |

* cited by examiner

*Primary Examiner* — Kambiz Zand
*Assistant Examiner* — Phuc Pham
(74) *Attorney, Agent, or Firm* — Quarles & Brady LLP

(57) ABSTRACT

In an example implementation according to aspects of the present disclosure, a system, method, and storage medium to identify and score security vulnerabilities is disclosed. A memory and a processor receive security-related data from a plurality of client computing devices, create a security score for each the client computing devices. The processor identifies a subset of the client computing devices with security scores surpassing a threshold and remediates a security vulnerability on each of the subset.

20 Claims, 4 Drawing Sheets

SECURITY SCORES

BACKGROUND

An organization may utilize a fleet of computing devices issued to employees. The fleet of computing devices may include desktop computers, laptop computers, and mobile devices such as tablets and smart phones. Each of the computing devices may have a security subsystem installed to protect the computing device and the organization against computer malware and computer viruses.

DETAILED DESCRIPTION

An organization deploys fleets of laptop computers, desktop computers, and mobile computing devices such as tablets and mobile devices to employees. In an ever more connected world, each of these computing devices may be exposed to more security threats. Fleet managers within an organization may have difficult identifying at risk computing devices and subsequently remediating them prior to a security breach. As disclosed herein, a process, method and system for creating security scores associated with devices within a fleet.

In an implementation, a system with a processor coupled to memory to receive security-related data from client computing devices. The processor creates a security score for each the client computing devices based on an artificial intelligent software model. The processor identifies a subset of the client computing devices with security scores surpassing a threshold. The processor remediates a security vulnerability on each of the subset.

In another implementation, a processor receives security-related data client computing devices. The processor creates a security score for each of the client computing devices based on an artificial intelligent software model. The processor identifies a subset of the client computing devices with security scores surpassing a threshold. The processor renders a representation each of the subset the client computing devices and their respective security scores on a dashboard.

Figure 1:
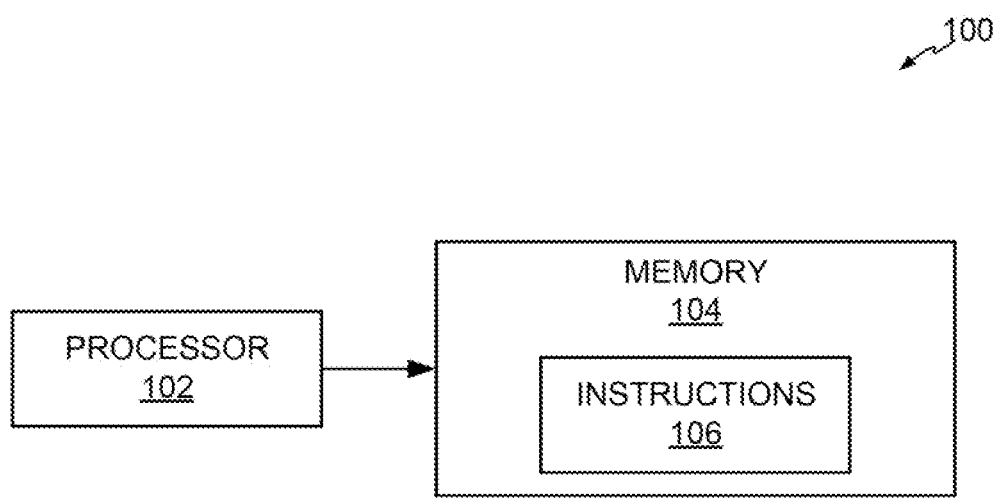
FIG. 1 is a block diagram of a system for creating security scores, according to an example.

FIG. 1 is a block diagram of a system 100 for creating security scores, according to an example. The system 100 may include a processor 102, memory 104 and instructions 106.

The processor 102 of the system 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualize logical processor may actually be executed on hardware circuitry; however, the hardware circuitry is not dedicated. The hardware circuitry may be in a shared environment where utilization is time sliced. In some implementations the virtualized logical processor includes a software layer between any executing application and the hardware circuitry to handle any abstraction which also monitors and save the application state. Virtual machines (VMs) may be implementations of virtualized logical processors.

A memory 104 may be implemented in the system 100. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic ram (DRAM) or other hardware implementations for storing processor instructions. Additionally, the virtualized logical memory may be implemented in a software abstraction which allows the instructions 106 to be executed on a virtualized logical processor, independent of any dedicated hardware implementation.

The system 100 may also include instructions 106. The instructions 106 may be implemented in a platform specific language that the processor 102 may decode and execute. The instruction 106 may be stored in the memory 104 during execution. The instructions 106 may be encoded to perform operations such as receiving security-related data from a plurality of client computing devices, creating a security score for each of the plurality of client computing devices based on an artificial intelligent software model, identifying a subset of the plurality of client computing devices with security scores surpassing a threshold; and remediating a security vulnerability on each of the subset. Instructions 106 may also be implemented as also identifying a second subset of the plurality of client computing devices and determining an organizational security score based on the security scores of each of the second subset of the plurality of client computing devices.

In another implementation, the instructions 106 may be implemented as also rendering a visual representation of the organizational security score and rendering a visual representation of the security scores of the second subset of the plurality of client computing devices.

Additionally, the system 100 may include other components to support the instructions 106 which are not shown. For example, the instructions include receiving security-related data. Communication to the client computing devices may be implemented via networking infrastructure (not shown). For example, the system 100 may be interfaced with a personal area networks, local area network, a wide area network, or the internet utilizing industry standardized networking interfaces.

Figure 2:
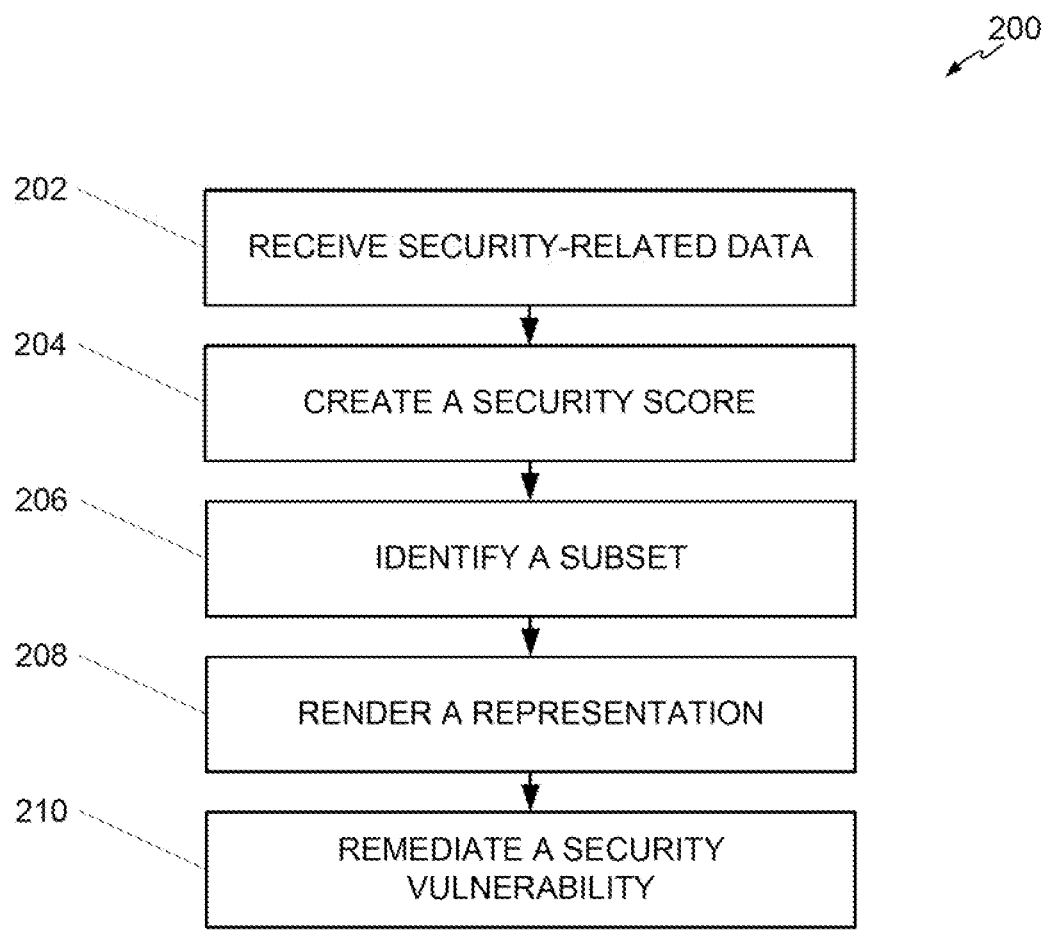
FIG. 2 is a block diagram corresponding to a method for remediating security vulnerabilities based on security scores, according to an example.

FIG. 2 is a block diagram corresponding to a method 200 for remediating security vulnerabilities based on security scores, according to an example. Referring to FIG. 1, the method 200 expressed in FIG. 2 may be implemented in instructions 106 and executed by the processor 102.

The processor 102 may receive security-related data from a plurality of client computing devices at block 202. In fleet-based computing systems, client computing devices may be deployed with telemetry agents installed. The telemetry agents may operate as background processes or as system services. The telemetry agents may monitor various subsystems within the client computing device where faults may lead to system failures. The goal of the telemetry agent may be to provide a dataset of information corresponding to the operational state of the client computing device at any given point of time. In each system-related data received, the telemetry agent may include a device identifier. The device identifier may be a serial number or another unique identifier to correlated datasets from the same client computing device. The telemetry agent may collect system-related data corresponding to the operating system (OS) of the client computing device, drivers of the client computing device, antimalware or antivirus software of the client computing device, or firmware protection systems of the client computing device. Additionally, the telemetry agent may identify system level settings which may be problematic to secure operation of the client computing device. For example, antivirus software may have been disabled by user action. A set of system-related data as retrieved by the telemetry agent and received at the processor 102 may be illustrated in Table 1. The examples in Table 1 are not exhaustive but provide an example of the data that the telemetry agent on the client computing device may collect for determining a security score. The examples in Table 1 provide a data source representative of a specific subsystem that may report the respective information corresponding to the attribute.

TABLE 1

| Data Source | Attribute | Initial Weight |
|---|---|---|
| System Monitor | AvgCPU | 100% |
| System Monitor | AvgRam | 100% |
| System Monitor | % time with internet | 100% |
| System Monitor | Cores | 100% |
| System Monitor | MaxClock | 100% |
| Firmware Monitor | EventType | 100% |
| Firmware Monitor | AttackType | 100% |
| Firmware Monitor | isEnabled | 100% |
| Firmware Monitor | Non-Protection in days | 100% |
| Anti-Malware | Threat Count in last 90 days | 100% |
| Anti-Malware | Severity | 100% |
| Anti-Malware | EventType | 100% |
| Anti-Virus | IsUpdatedDefinition | 100% |
| Anti-Virus | Severity | 100% |
| Anti-Virus | Category | 100% |
| Anti-Virus | Threat Count in 90 days | 100% |

The processor 102 may create a security score for each of the plurality of client computing devices based on an artificial intelligent software model at block 204. In one implementation, multiple attack methods may be evaluated: operating system attack, firmware attack, malware/virus attack, and firewall/encryption attack. In each of these categorical attack methods, different data sources and attributes in Table 1 may be more correlative to the probability of attack. Due to the correlation between the data sources/attributes to the type of attack method, a Bayesian network model may be utilized as the artificial intelligent software model to create the security score. Bayesian networks may be good for taking an event that occurred and predicting the likelihood that any one of several possible known causes was the contributing factor.

A rules engine may be utilized to create conditional probability tables for each of the attack methods to be utilized by the Bayesian network. For example, an operating system attack may utilize a different rules engine compared to a firmware attack. The purpose is to differentiate the appropriate conditional probability table based on the attributes present, and their likelihood to indicate that specific attack method. Table 2 is an example of a conditional probability table for an operating system attack corresponding to attributes from table 1:

TABLE 2

| Event | Evidence | | | |
|---|---|---|---|---|
| OSAttack | AvgCPU | AvgRAM | Cores | MaxClock |
| False | False | True | False | True |
| True | True | True | True | True |
| False | True | True | False | False |

As illustrated, Table 2 may be a subset of attributes corresponding to an operating system attack. As previously stated, the conditional probability values correspond to the results of a rules-based engine per attack method. For example, the attribute AvgCPU may be reported as 75% for an operating system attack. A rules-based engine may determine that value to not meet the threshold for a operating system attack and thereby set that field to FALSE in the table. Whereas the same value may be determined by a rules-based engine for a firmware attack to be TRUE. As with the conditional probability table, with each combination of variables includes a probability value. For example, in an operating system attack, average CPU utilization (AvgCPU in Table1 and Table 2) may be weighted with a probability value of 5%. Additionally, in an operating system attack, Avg RAM may have a 10% weighting. A rules-based engine may be utilized to drive the weighting based on empirical evidence discovered by informational technologists in the field and is outside the scope of this disclosure.

Based on the conditional probability table, and the associated weighting, a probability function may return a value corresponding to an event. For example, in a simple case: Probability (Event=(OS Attack=="FALSE"), Evidence= (AvgCPU=="TRUE")))=0.3. In determining the security score, the specified evidences per event may be determined by an information technology officer. By allowing the flexible adaptation of the event vs evidence approach, an information technology officer may utilize empirical evidence gathered as to what data is more relevant in calculating a score.

The resultant probability value may be utilized as a component of the security score. The security score comprises the aggregation of all relevant probability values for an event for each attack method desired (e.g. operating system attack, firmware attack, etc.). The aggregation of each probability value represents an overall security score indicative of the security risk of an entire client computing device.

The processor 102 may identify a subset of the plurality of client computing devices with security scores surpassing a threshold at block 206. As the telemetry agent has provided a unique identifier to each of the received system-related data, the data may be correlated to specific devices. Utilizing a database lookup, a security score may be correlated to a specific device. Additionally, as the security score may be an aggregation of probability values, a threshold may be determined which constitutes an unsatisfactory risk. Risk may be relative, and therefore the threshold may be subjective and predetermined by an information technology officer. Utilizing the unique identifier associated with each client computing device, a subset of client computing devices which have security scores surpassing the threshold may be identified. The subset of devices may be flagged in a database for later retrieval or may be stored in memory as a list to be utilized by other functions.

The processor 102 may render a representation each of the subset of the plurality of client computing devices and a corresponding security score to each of the subset on a dashboard at block 208. The processor 102 may retrieve the subset of the client computing devices identified at block 206 from the database or, in another implementation, as a passed memory handle, and present them as a list of high security risk client computing devices. The list may be sorted from highest risk (e.g. highest security score) to lowest security score that surpassed the threshold. Additional information from system-related data collected by the telemetry agent may be displayed to better identify the client computing device represented in the rendering.

The processor 102 may remediate a security vulnerability on each of the subset at block 210. Based on the security score surpassing a threshold, the processor 102 may interact with an endpoint management system. The processor 102 may utilize an application programming interface (API) to interface with the endpoint management system. The endpoint management system may enforce organizational policies for deployed or issued client computing devices. Based on the security score, the processor 102 may send an endpoint management instruction to enable an antivirus program. The instruction may include a reference to the client computing device (e.g. unique identifier) and an action. The action may include enabling firmware monitoring software, antivirus software, firewalls, etc.

The processor 102 may identify a second subset of the plurality of client computing devices and determine an organizational security score based on the security scores of each of the second subset of the plurality of client computing devices. As described previously, unique identifiers corresponding to client computing devices of an organization may be mapped to that organization. A database of all unique identifiers may be utilized to identify the second subset of client computing devices out of the whole scored by the processor 102. The second subset corresponding to the organization may be aggregated and averaged to determine an overall security score for the organization.

The processor 102 may render a visual representation of the organizational security score and rendering a visual representation of the security scores of the second subset of the plurality of client computing devices. The organization security score may be rendered in a dashboard interface to provide an information technology officer a high-level view of the security risk of the entire organization as a whole. Likewise, the second subset of client computing devices corresponding to the organization may be rendered in a list. The list may be ordered that higher risk devices are place at the top and draw the viewers attention so that they may be addressed.

Figure 3:
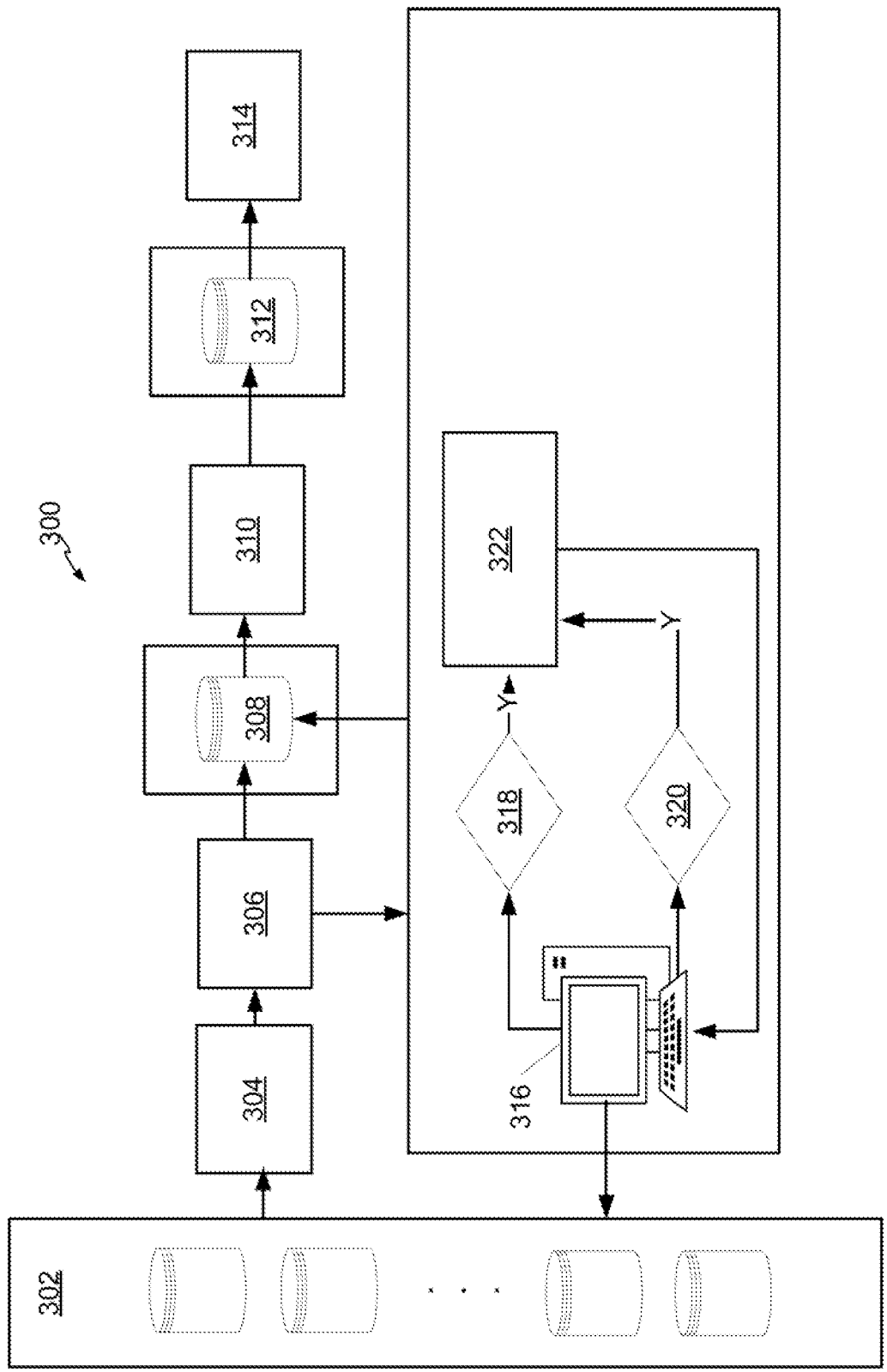
FIG. 3 is a block diagram of components used to create security scores, according to an example.

FIG. 3 is a block diagram 300 of components used to create security scores, according to an example. The block diagram 300 provides visual representation of the components to create security scores in one implementation.

As described previously, a telemetry agent executes on a client computing device 316. In a microservices implementation, the system-related data returned from the telemetry agent may be collected at end point security databases 302. The end point security databases 302 may provide APIs to service requests for system-related data. Likewise, they may be programmatically induced to transmit system-related data to a processor 102, on a predetermined interval. The end point security databases 302 may be utilized for non-security score generation purposes. Each database may collect respective system-related data corresponding to a certain subject. For example, firmware-related data may be stored in one database, and operating system data may be stored in another.

Prior to security score creation, data preparation and extraction 304 may be performed. Data preparation and extraction 304 may retrieve the system-related data from the end point security databases 302. The system-related data may be scrubbed of any outlier data. For example, bounds may be applied to data fields to eliminate error. Likewise, any derived values may be determined at this point. For example, average CPU utilization per core on multicore processors that support it may be a value that is determined at this step.

The security score creation 306 may execute the rules-based engines and Bayesian network described previously on the, now cleaned, system-related data. A security score may be an output value. The outputted security score may be the stored in a security score database 308. The security score database 308 may include all of the created security scores as well as corresponding unique identifiers linking the security scores to their respective client computing devices.

After the security score has been stored in the security score database 308 a data transformation 310 takes place to provide more insight into what the security score means. The data transformation 310 provides context to the security score. The data transformation 310 links the security scores, the unique identifiers, and organizations to create the previously discussed second subset, as well as organizational security scores.

A reporting database 312 stores the resultant data transformation 310 in a format more applicable for display. The reporting database 312 may correlate security scores, organizational security scores, and the client computing devices to graphical representations. The reporting database 312 may include a web page server to host graphical assets and the security score. The reporting database 312 may transmit all of the information in a standards complaint displayable format, illustrating the security scores, the client computing device unique identifiers, and organizational scores.

A rendered security score 314 present the security score in context and provides insights and meaning to the system-related data received from the end point security databases 302. In one implementation, the rendered security score 314 may be rendered in a web browser.

As described previously, a client computing device 316 provides system-related data to the end point security databases 302. Additionally, and end point management system may execute on the client computing device 316.

Based on the security score surpassing a threshold, the processor may determine if latest security software is installed 318. A flag, set by the telemetry agent, in the system-related data may indicate whether the latest security software is installed. In another implementation, the system-related data may include the installed version of the security software, to be compared by the processor against the latest version of the same security software. If the security software is not up to date with the latest version, the processor 102 may send instructions to the end point management software to push the latest version to the client computing device.

If the latest security software is installed, the processor 102 may determine if latest operating system software is installed 320. Again, and similar to the security software, the telemetry agent collects versioning information corresponding to the operating system in the system-related data. The processor may determine that the operating system is not current with the latest version and may send instruction to the end point management software to push an operating system update.

After the security software and the operating system have been checked, the processor sends a message to the end point management software to flush a request buffer and push an update to the telemetry agent 322. The telemetry agent may receive the end point management's push and install any required security software and operating system updates to secure the client computing device.

Figure 4:
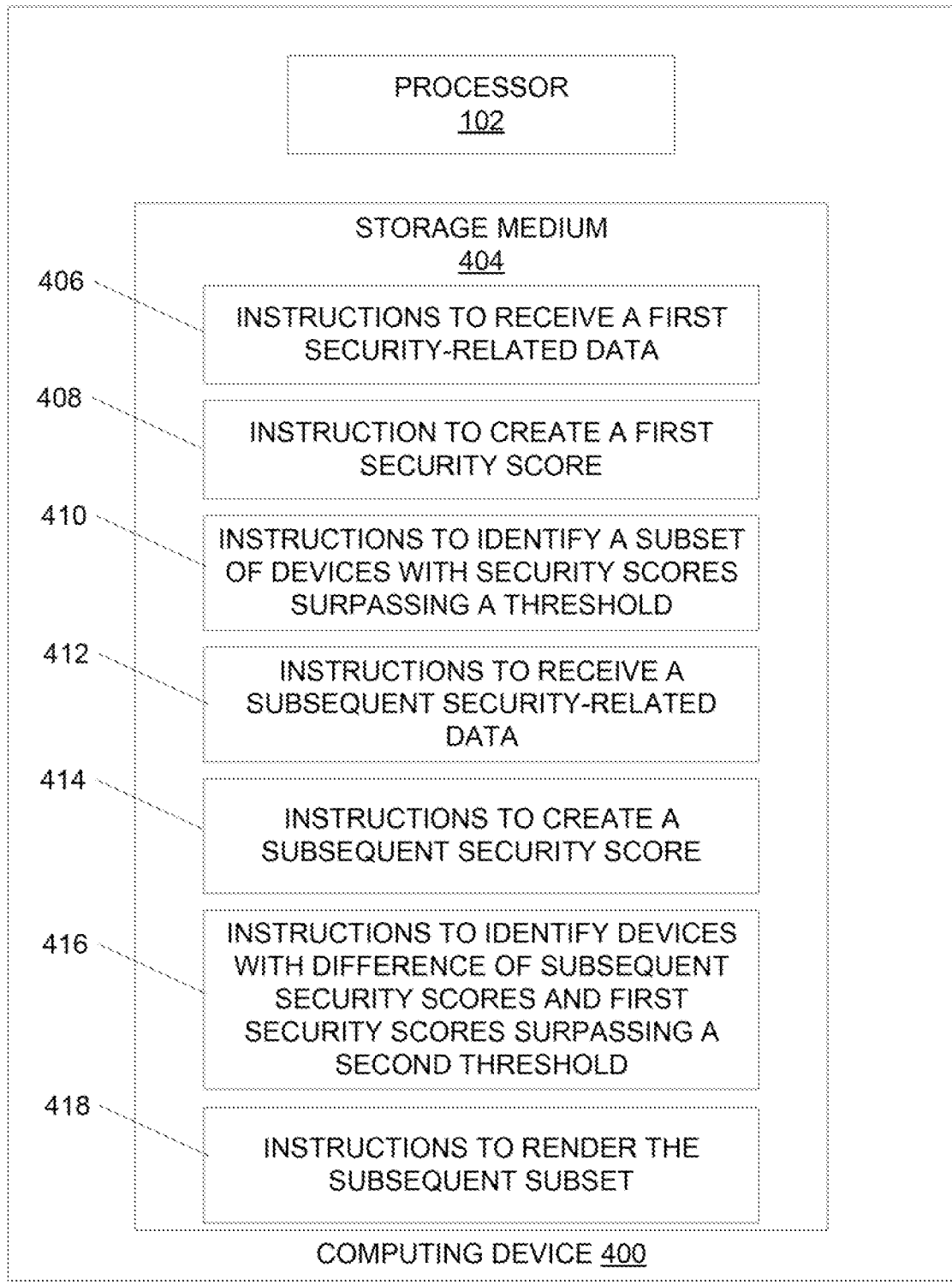
FIG. 4 is a computing device for supporting instructions for creating security scores, according to an example.

FIG. 4 is a computing device for supporting instructions for creating security scores, according to an example. The computing device 400 depicts a processor 102 and a storage medium 404 and, as an example of the computing device 400 performing its operations, the storage medium 404 may include instructions 406-418 that are executable by the processor 102. The processor 102 may be synonymous with the processor 102 referenced in FIG. 1. Additionally, the processor 102 may include but is not limited to central processing units (CPUs). The storage medium 404 can be said to store program instructions that, when executed by processor 102, implement the components of the computing device 400.

The executable program instructions stored in the storage medium 404 include, as an example, instructions to receive a first security-related data from a plurality of client computing devices 406, instructions to create a first security score for each of the plurality of client computing devices based on an artificial intelligent software model 408, instructions to identify a subset of the plurality of client computing devices with security scores surpassing a threshold 410, instructions to receive a subsequent security-related data from a plurality of client computing devices 412, instructions to create a subsequent security score for each of the plurality of client computing devices based on an artificial intelligent software model 414, instructions to identify a subsequent subset of the plurality of client computing devices with the difference of the subsequent security scores and the first security scores surpassing a second threshold 416, and instructions to render the subsequent subset of the plurality of client computing devices on a display 418.

Storage medium 404 represents generally any number of memory components capable of storing instructions that can be executed by processor 102. Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, processor 102 represents any number of processors capable of executing instructions stored by storage medium 404. Processor 102 may be integrated in a single device or distributed across devices. Further, storage medium 404 may be fully or partially integrated in the same device as processor 102, or it may be separate but accessible to that computing device 400 and the processor 102.

In one example, the program instructions 406-418 may be part of an installation package that, when installed, can be executed by processor 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
   a memory comprising instructions; and
   a processor communicatively coupled to the memory wherein the instructions when executed cause the processor to:
   receive security-related data from a plurality of client computing devices;
   for each client computing device of the plurality of client computing devices,
   evaluate a plurality of categorical attack methods using the security-related data;
   determine, as a plurality of probability values, a probability value for each categorical attack method of the plurality of categorical attack methods; and
   create, based on an aggregation of the plurality of probability values, an overall security score using an artificial intelligent software model;
   identify, responsive to creation of the overall security score for each of the plurality of client computing devices, a subset of the plurality of client computing devices with overall security scores surpassing a threshold; and
   remediate a security vulnerability on each of the subset of the plurality of client computing devices.

2. The system of claim 1, the instructions when executed further cause the processor to:
   identify a second subset of the plurality of client computing devices; and
   determine an organizational security score based on the overall security scores of each of the second subset of the plurality of client computing devices.

3. The system of claim 2, the instructions when executed further cause the processor to:
   render a visual representation of the organizational security score; and render a visual representation of the overall security scores of the second subset of the plurality of client computing devices.

4. The system of claim 1, wherein the artificial intelligent software model comprises a Bayesian network model.

5. The system of claim 1, the instructions when executed cause the processor to send an endpoint management instruction to enable an antivirus program to remediate the security vulnerability.

6. A method comprising:
receiving, with a processor, security-related data from a plurality of client computing devices;
for each client computing device of the plurality of client computing devices,
evaluating, with the processor, a plurality of categorical attack methods using the security-related data;
determining, with the processor, as a plurality of probability values, a probability value for each categorical attack method of the plurality of categorical attack methods; and
creating, with the processor, an overall security score using an artificial intelligent software model;
identifying, with the processor, a subset of the plurality of client computing devices with overall security scores surpassing a threshold;
rendering, with the processor, a representation for each of the subset of the plurality of client computing devices and a corresponding overall security score to each of the subset on a dashboard; and
remediating, with the processor, a security vulnerability on each of the subset of the plurality of client computing devices.

7. The method of claim 6, further comprising:
identifying, with the processor, a second subset of the plurality of client computing devices; and
determining, with the processor, an organizational security score based on the overall security scores of each of the second subset of the plurality of client computing devices.

8. The method of claim 7, further comprising:
rendering, with the processor, a visual representation of the organizational security score; and
rendering, with the processor, a visual representation of the overall security scores of the second subset of the plurality of client computing devices.

9. The method of claim 6, wherein creating, with the processor, the overall security score using the artificial intelligent software model includes creating the overall security score using a Bayesian network model.

10. The method of claim 6, wherein the remediating the security vulnerability comprises sending, with the processor, an endpoint management instruction to enable an antivirus program.

11. A non-transitory computer readable medium comprising instructions executable by a processor to:
receive a first security-related data from a plurality of client computing devices;
for each client computing device of the plurality of client computing devices,
evaluate a plurality of categorical attack methods using the security-related data;
determine, as a plurality of probability values, a probability value for each categorical attack method of the plurality of categorical attack methods; and
create, based on an aggregation of the plurality of probability values, a first security score using an artificial intelligent software model;
identify a subset of the plurality of client computing devices with first security scores surpassing a threshold;
receive a subsequent security-related data from a plurality of client computing devices;
for each client computing device of the plurality of client computing devices,
evaluate the plurality of categorical attack methods using the subsequent security-related data;
determine, as a plurality of subsequent probability values, a subsequent probability value for each categorical attack method of the plurality of categorical attack methods; and
create, based on a subsequent aggregation of the plurality of subsequent probability values, a subsequent security score using the artificial intelligent software model;
identify a subsequent subset of the plurality of client computing devices with the difference of the subsequent security scores and the first security scores surpassing a second threshold; and
render the subsequent subset of the plurality of client computing devices on a display.

12. The medium of claim 11 the instructions further comprising:
identify a second subset of the plurality of client computing devices corresponding to an organization; and
determine an organizational security score based on the subsequent security scores of each of the subsequent subset of the plurality of client computing devices.

13. The medium of claim 12 the further comprising:
render a visual representation of the organizational security score; and render a visual representation of the subsequent security scores of the second subset of the plurality of client computing devices.

14. The medium of claim 11 wherein the artificial intelligent software model comprises Bayesian network model.

15. The medium of claim 11 remediating the security vulnerability comprises sending an endpoint management instruction to enable an antivirus program.

16. The system of claim 1, wherein the security-related data includes a plurality of device identifiers for the plurality of client computing devices, and wherein the instructions when executed cause the processor to identify the subset of the plurality of client computing devices using the plurality of device identifiers.

17. The system of claim 1, wherein the security-related data includes an installed version of security software.

18. The system of claim 1, wherein the security-related data includes an installed version of an operating system.

19. The system of claim 1, wherein the security-related data includes at least one of a dataset of information corresponding to an operational state of a corresponding client computing device or a device identifier of the corresponding client computing device.

20. The system of claim 1, wherein the plurality of categorical attack methods includes an operating system attack and a firmware attack, and wherein the plurality of probability values includes a probability value associated with the operating system attack and a probability value associated with the firmware attack.

* * * * *